US007510537B2

(12) United States Patent
Imboden et al.

(10) Patent No.: US 7,510,537 B2
(45) Date of Patent: Mar. 31, 2009

(54) PERSONAL VIBRATOR WITH REPLACEABLE MOTOR HAVING THE APPEARANCE OF A BATTERY

(76) Inventors: Ethan Frederic Imboden, 2479 Folsom St., @ 21st, San Francisco, CA (US) 94110; Philipe Sage, 180-4 Constitution Dr., Menlo Park, CA (US) 94025; Roland Jeffrey Wyatt, 786 Red Oak Ave., #795, Albany, CA (US) 94706

( * ) Notice: Subject to any disclaimer, the term of this patent is extended or adjusted under 35 U.S.C. 154(b) by 0 days.

(21) Appl. No.: 11/264,204

(22) Filed: Nov. 1, 2005

(65) Prior Publication Data

US 2006/0094992 A1 May 4, 2006

Related U.S. Application Data

(60) Provisional application No. 60/624,360, filed on Nov. 2, 2004.

(51) Int. Cl.

*A61H 23/02* (2006.01)
*A61H 19/00* (2006.01)
*A61H 21/00* (2006.01)
*H02K 7/065* (2006.01)

(52) U.S. Cl. ................... 601/70; 601/72; 601/DIG. 16; 310/81; 600/38

(58) Field of Classification Search ................... 601/46, 601/48, 70, 72, 71, 73, 74, DIG. 16; 600/38; 310/81

See application file for complete search history.

(56) References Cited

U.S. PATENT DOCUMENTS

| | | | | |
|---|---|---|---|---|
| 3,451,391 | A * | 6/1969 | Tavel | 601/72 |
| 2002/0019248 | A1 * | 2/2002 | Ruck | 455/566 |
| 2004/0102725 | A1 * | 5/2004 | Wang et al. | 601/72 |

FOREIGN PATENT DOCUMENTS

| | | | | |
|---|---|---|---|---|
| DE | 3316100 | A1 | * | 11/1984 |
| DE | 3517774 | | * | 11/1986 |
| WO | WO 9604620 | A1 | * | 2/1996 |
| WO | WO2004/091236 | | * | 10/2004 |

OTHER PUBLICATIONS

Sekiguchi et al., Development of Battery Type Vibration Motor, 1990, Tokyopatsukogyo Denki Gakkai Kaitenki Kenkyukai Shiryo, vol. RM-90,No. 88-106, pp. 109-116, fig.13, Tel.1, Ref.2, Conference Proceeding, and translation.*

* cited by examiner

*Primary Examiner*—Danton DeMille

(57) ABSTRACT

A vibrating massager includes a housing (10), a power source (14) supported by the housing and a replaceable motor (12). The housing (10) and motor (12) are configured so that the motor may be readily replaced by a human operator without the need to replace the housing, power source, or other components. The motor (12) may be sized and configured to substitute for a conventional battery in a multi-battery device. When positioned in place of a battery in a supporting device, the motor operates to impart a vibrating motion to the supporting device.

23 Claims, 11 Drawing Sheets

PERSONAL VIBRATOR WITH REPLACEABLE MOTOR HAVING THE APPEARANCE OF A BATTERY

RELATED APPLICATIONS

This application claims the benefit of U.S. provisional patent application 60/624,360 filed Nov. 2, 2004.

FIELD OF THE INVENTION

The present invention relates generally to vibrating massagers and more particularly to a vibrator incorporating a replaceable motor.

BACKGROUND OF THE INVENTION

Personal vibrators, also known variously as vibrators, massagers, vibrating massagers and by numerous other names, are well-known in the art. They come in a variety of configurations and perform a variety of functions, ranging from medical therapy to erotic stimulation. They may be battery-powered or run on conventional alternating current electricity.

Typically, battery-powered vibrating massagers have a short lifespan. The most common means of generating the vibrating motion is to mount a weight on a rotational motor such that the center of gravity of the weight is off of the axis of rotation. When operated, the off-axis rotating weight imparts a desired vibration to a housing. While this produces the desired vibratory motion, this configuration is inherently damaging to the motor, and is often the cause of the failure of the product. It is also common that over the lifespan of a vibrating massager, the motor will become noisier as the strain of the off-axis weight degrades the functioning of the motor's bushings and internal components. Once the motor expires or becomes unacceptably noisy, the massager no longer serves its intended purpose and must be discarded and replaced.

It would be desirable to provide a vibrator wherein the electronic motor is easily replaced, thus preserving the value of the larger unit. It would be further desirable to provide a vibrator motor which is easily replaceable within a vibrating massager.

SUMMARY OF THE INVENTION

In accordance with one embodiment of the invention, there is provided a new and improved vibrator having a replaceable motor. In accordance with another embodiment of the invention, there is provided a vibrator having an easily replaceable motor. In accordance with yet another embodiment of the invention there is provided a motor particularly suited for use in a vibrating device, the vibrator motor optionally configured in size, shape and electrical connections to simulate and substitute for a battery.

The vibrator of the present invention incorporates a motor easily replaceable by a human operator either without the use of tools and/or using conveniently available tools. The motor is replaceable without the need to replace other components, including the housing, power switch or power source. The invention thus provides a vibrator wherein the motor, a likely point of failure, can be cost-effectively and easily replaced while preserving the value of the larger unit.

In the described embodiment, the vibrator motor of the present invention is sized and configured with external electrical contacts so as to simulate a selected battery type. The vibrator motor may be inserted into a battery compartment of any device incorporating at least two batteries and receive operating power from the at least one other battery.

In addition to the easily replaceable motor, the personal vibrator of the present invention exhibits many desirable features, including but not limited to being: small in size, water- and fluid-resistant, virtually silent in operation, simple to disassemble and clean and constructed of bio-compatible materials pleasant in look, touch and feel to the user.

DESCRIPTION OF THE DRAWING FIGURES

These and other objects, features and advantages of the present invention will become apparent to the reader through a consideration of the Detailed Description of the Invention when considered in conjunction with the Drawing Figures, in which:

FIGS. 1A, 1B, 1C, and 1D show, respectively, a disassembled perspective view, a disassembled plan view, an assembled plan view, and an assembled cut-away view of a personal vibrator in accordance with the present invention;

Figure 7A:
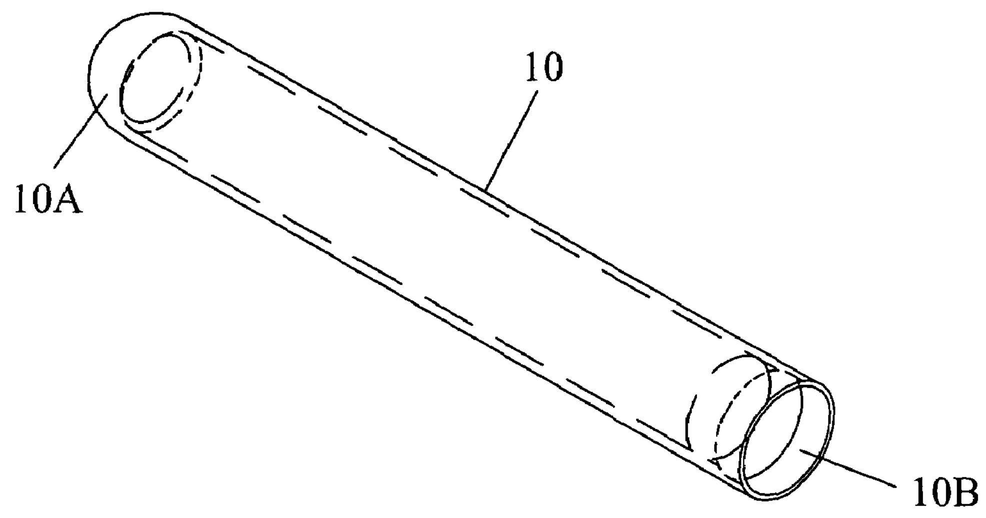
Figure 7B:
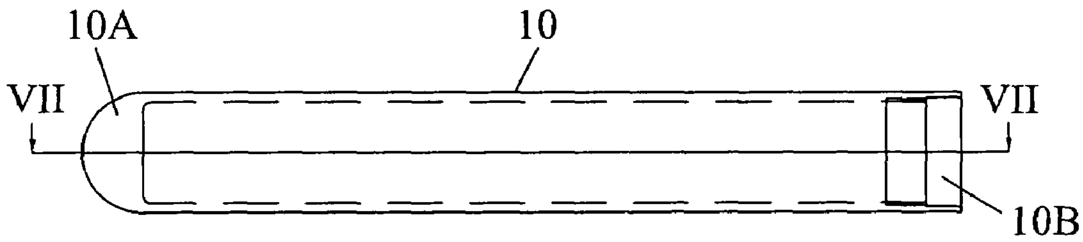
Figure 7C:
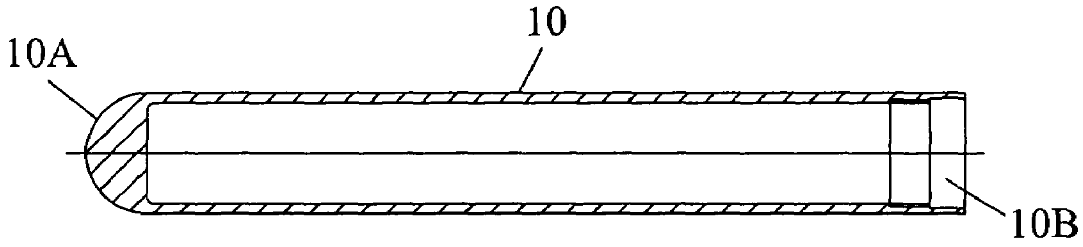
Figure 8A:
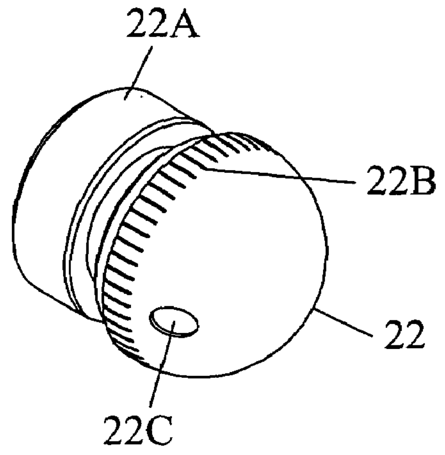
Figure 8B:
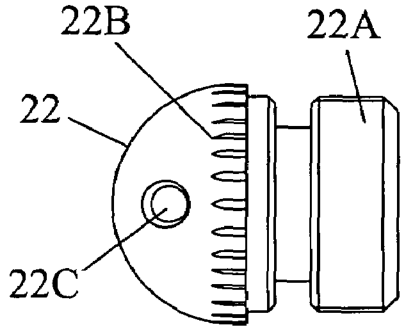
Figure 8C:
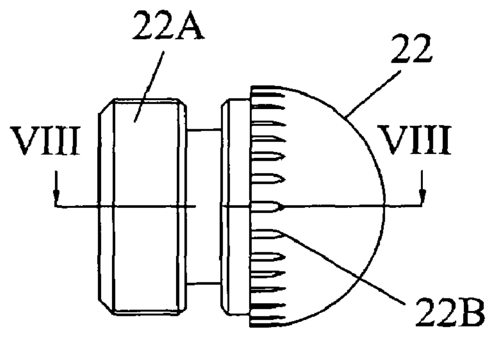
Figure 8D:
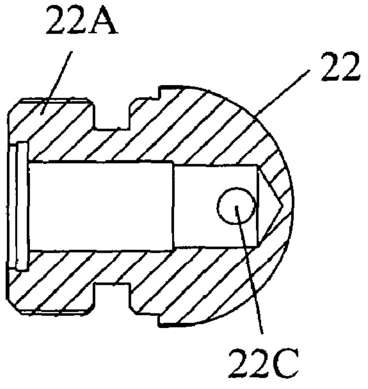
Figure 9A:
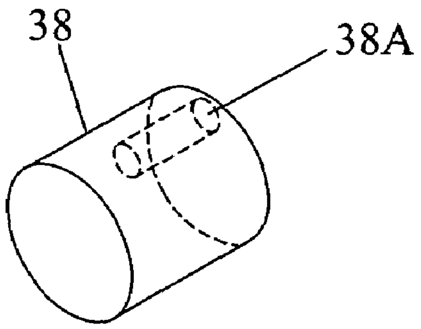
Figure 9B:
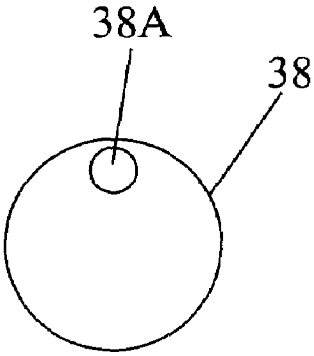
Figure 9C:
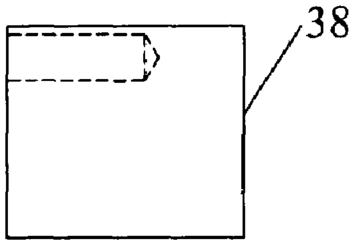

FIGS. 7A, 7B, and 7C show, respectively, a perspective view, a plan view and a cut-away view the metal housing of FIG. 1;

FIGS. 8A, 8B, 8C and 8D show, respectively, a perspective view, an end view, a cut-line view and a cut-away view of the housing cap of FIG. 1; and FIGS. 9A, 9B and 9C show, respectively, an end view, a side view and a cut-away view of the offset weight of FIG. 2.

DETAILED DESCRIPTION OF THE INVENTION

There is provided herein a personal vibrator employing a vibrating motor configured to be easily replaced. The invention thus enables a user to quickly and easily repair, rather than discard, a vibrator that is noisy or is no longer functioning due to motor failure. The motor itself is shown configured in shape and electrical connection to simulate a battery so that it may easily be inserted into any device incorporating at least two such batteries.

Figure 1A:
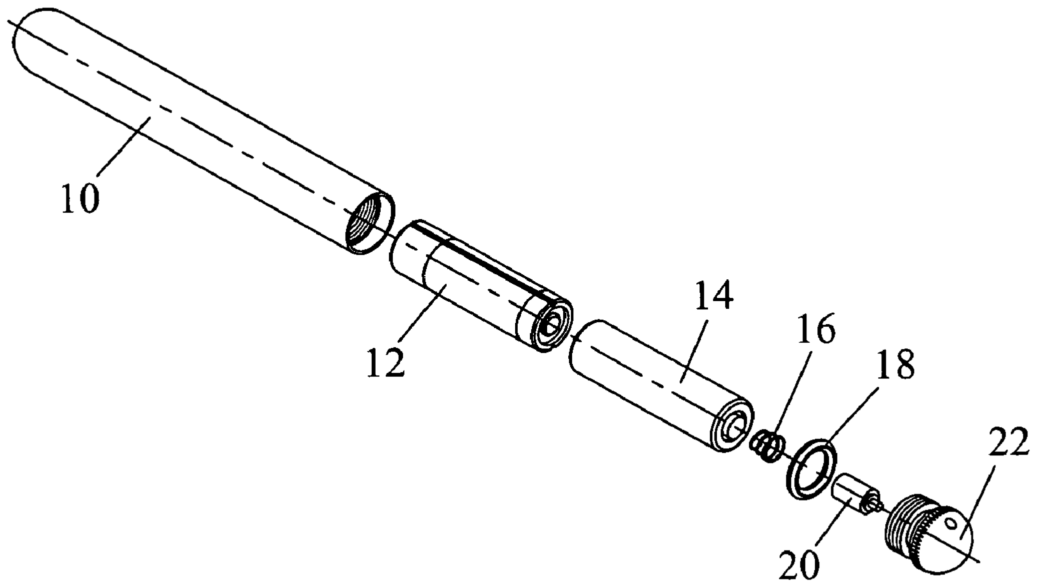
Figure 1B:
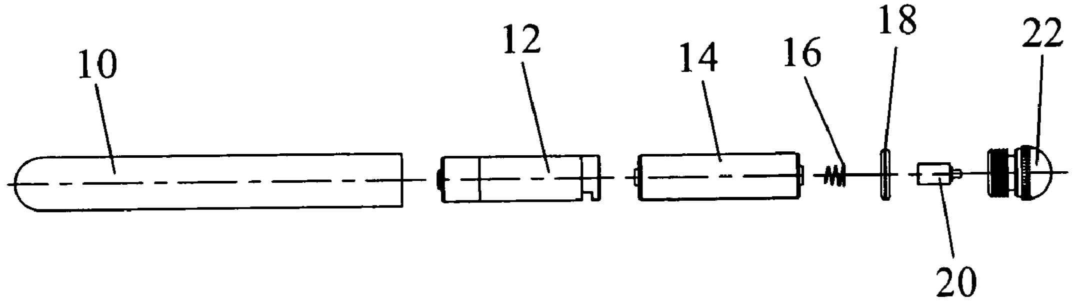
Figure 1C:
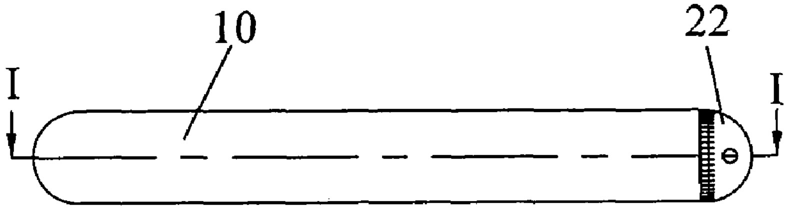
Figure 1D:
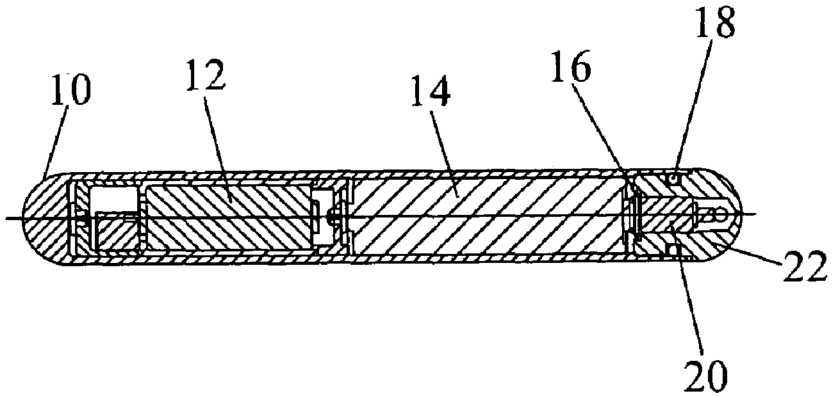
Figure 2A:
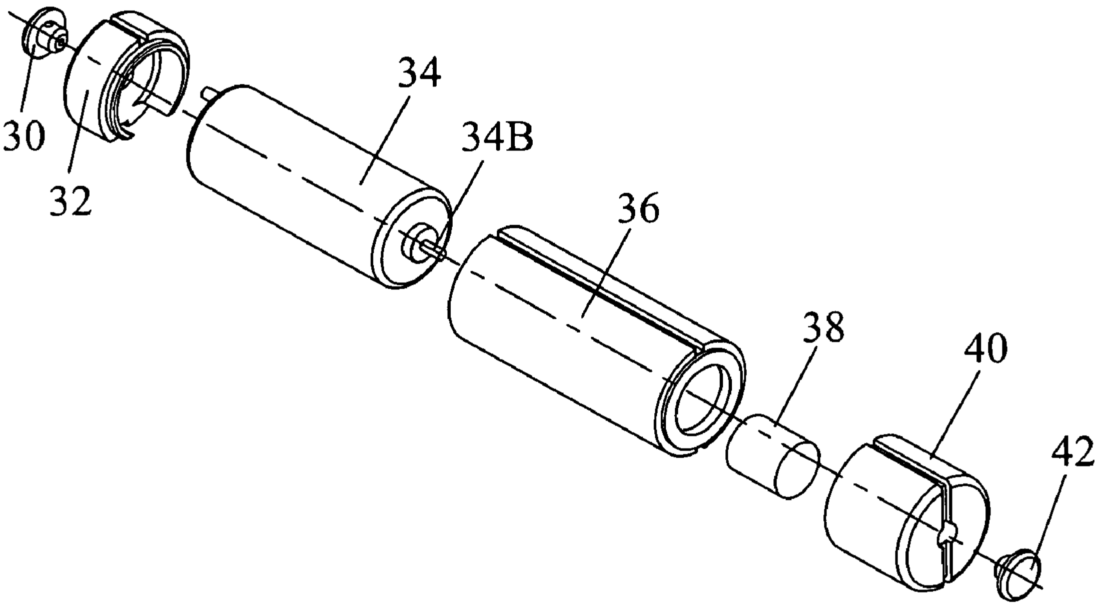
FIGS. 2A, 2B, 2C and 2D show, respectively, a disassembled perspective view, a disassembled plan view, an assembled cut-line view and an assembled cut-away view of the motor mount assembly of FIG. 1.
Figure 2B:
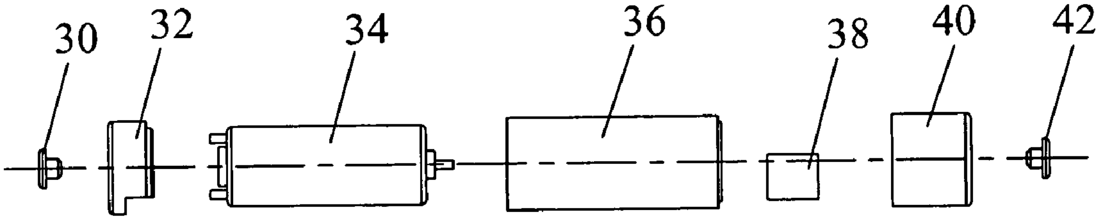
Figure 2C:
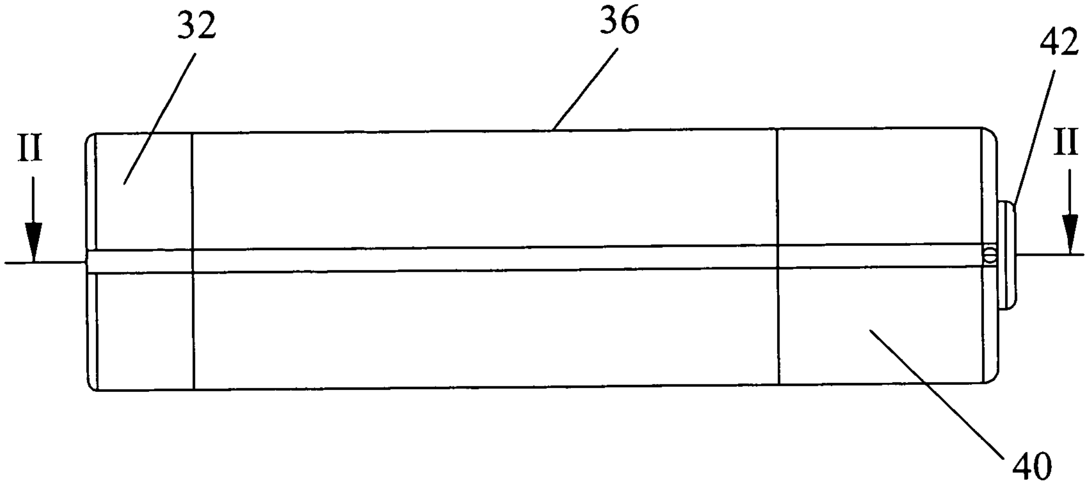
Figure 2D:
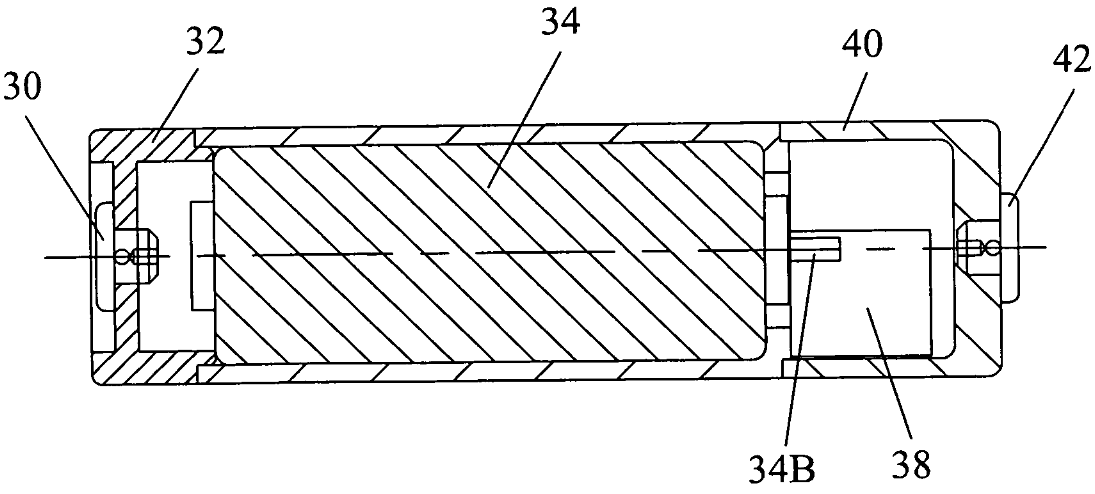
Figure 3A:
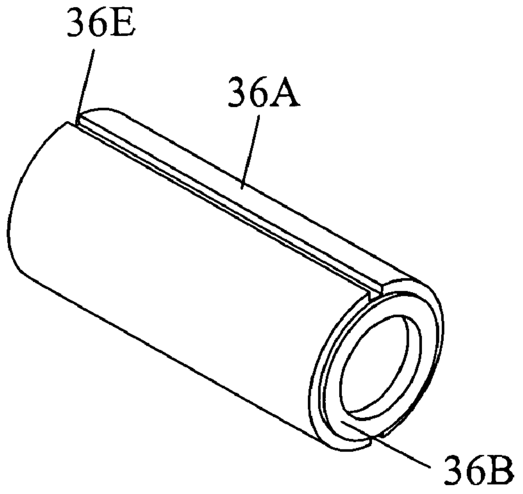
FIGS. 3A, 3B, 3C and 3D show, respectively, a perspective view, an end view, a cut-line view and a cut-away view of the motor mount center of FIG. 2.
Figure 3B:
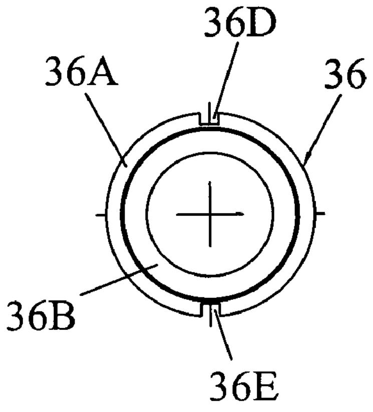
Figure 3C:
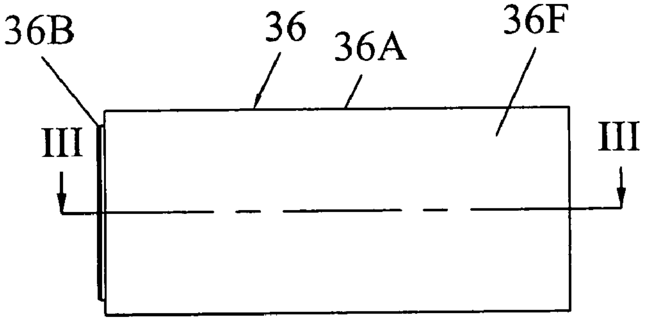
Figure 3D:
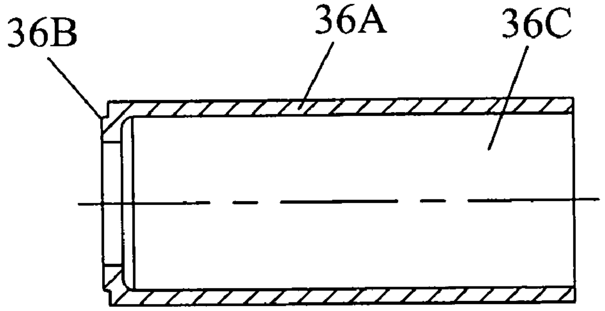
Figure 4A:
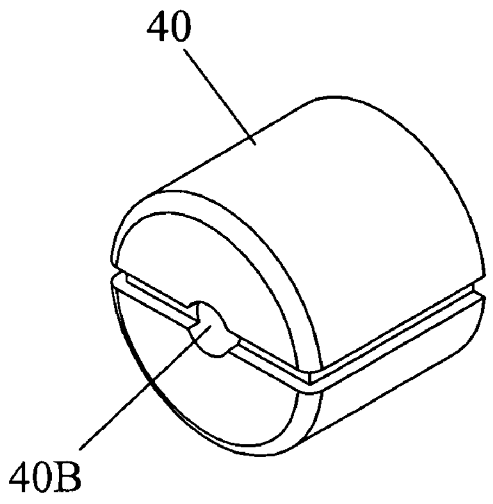
FIGS. 4A, 4B, 4C and 4D show, respectively, a perspective view, an end view, a cut-line view and a cut-away view of the motor mount positive cap of FIG. 2.
Figure 4B:
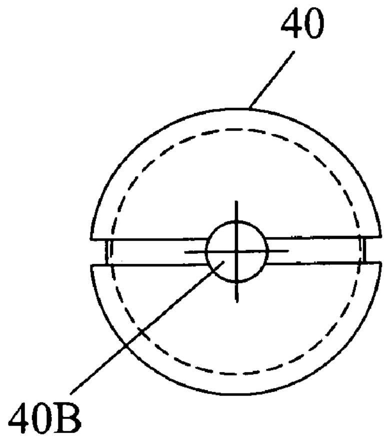
Figure 4C:
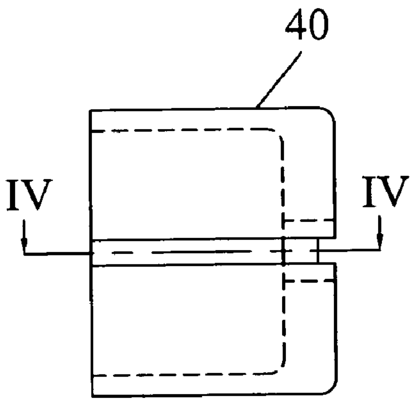
Figure 4D:
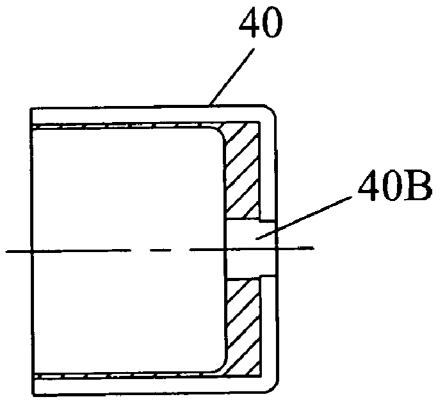
Figure 5A:
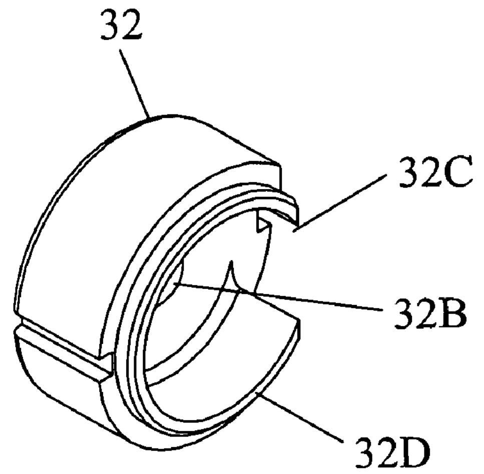
FIGS. 5A, 5B, 5C and 5D show, respectively, a perspective view, an end view, a cut-line view and a cut-away view of the motor mount negative cap of FIG. 2.
Figure 5B:
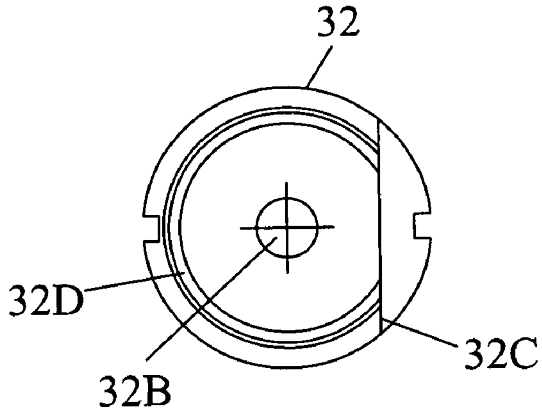
Figure 5C:
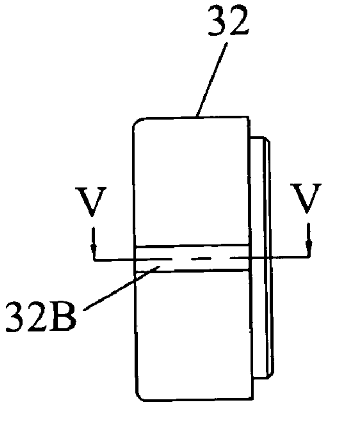
Figure 5D:
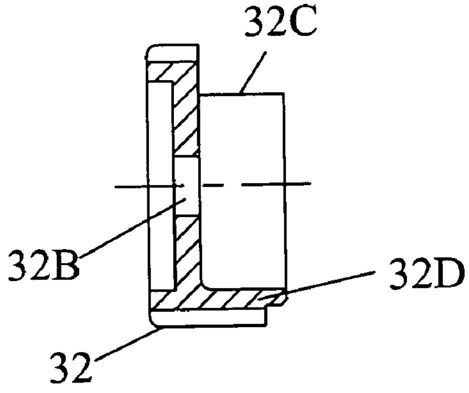

With reference now to FIGS. 1A, 1B, 1C there is shown a personal vibrator, also referred to herein as a vibrating massager. The vibrating massager consists of a metal housing 10 into which a motor assembly 12 can be inserted. When the motor assembly 12 is inserted with the positive contact 42 first, an electrical connection is made between the positive contact on the end of the motor assembly and the end wall of the metal housing 10. As will be further described below, motor assembly 12 can thus be powered by an adjoining battery. If the motor assembly 12 is inserted in the opposite orientation, with the negative contact 30 first, no contact is made and the massager is effectively deactivated.

After the motor assembly 12 is inserted, a standard AA battery is inserted. A check valve 20 is inserted into housing cap 22, followed by the battery contact spring 16. An O-ring 18 is fitted onto the housing cap 20. This housing cap assembly is then threaded into the open end of the housing 10. When the housing cap 22 is threaded far enough into the housing 10 that the battery contact spring 16 makes contact with the AA battery 14, a circuit is completed from the positive contact 42 through the housing 10 to the housing cap 22, through the battery contact spring 16, through the AA battery 14 to the negative contact 30, and the massager turns on. The housing cap can then be screwed in further until it stops, to completely seal the unit. At this point the vibrating massager is waterproof.

It will thus be appreciated that housing cap 22, through appropriate tightening and loosening, functions as an on/off switch. Numerous other electromechanical switches for operating the personal vibrator of the present invention will now be apparent to the reader. It will further be appreciated that battery 14 and motor assembly 12 may be inserted into metal housing 10 in any order, the motor assembly being operational so long as the positive and negative contacts are positioned in the correct polarities and the appropriate circuit with the battery completed.

With reference now to FIGS. 2A, 2B, 2C and 2D, details of motor assembly 12 are shown. The motor assembly 12 is seen to include a rotating DC motor 34, set within a motor mount 36 and connected to an eccentrically positioned offset weight 38 by a longitudinally extending pin, or axle 34B. A positive motor mount cap 40 and a negative motor mount cap 32 interconnect with each end of motor mount center 36, containing the motor 34 and weight 38 within the mount. Identical positive and negative contacts, indicated at 42 and 30, respectively, mechanically mount on and extend through the corresponding motor mount caps to provide electrical power to motor 34. Motor 34 may comprise a commercially available motor, for example of the type manufactured by Nidec Copal Corporation. As described in detail herein, motor assembly 12 is completely removable and changeable as an integrated unit. In the described embodiment, it is about the size and shape of the power source, a AA battery.

With reference now to FIGS. 3A, 3B, 3C and 3D, motor mount 36 is seen to include a cylindrical sleeve 36A, one end supporting a reduced-diameter, coaxially positioned cylindrical mount 36B spaced from the back surface of offset weight 38 and engaging positive motor mount cap 40. Sleeve 36 optionally includes longitudinally extending grooves, indicated at 36D and 36E, to facilitate assembly. An opposing end of sleeve 36A includes an opening 36F for engaging the motor mount cap 32.

With reference now to FIGS. 4A, 4B, 4C and 4D, positive motor mount cap 40 is seen to include a longitudinal aperture 40B for engaging contact 42. With reference to FIGS. 5A, 5B, 5C and 5D, negative motor mount cap 32 is seen to including a similar longitudinally extending aperture 32B for engaging negative contact 30, as well as a coaxial cylindrical lip 32D and a partial cut-away 32C of the cylindrical wall portion for engaging motor mount 36.

Figure 6A:
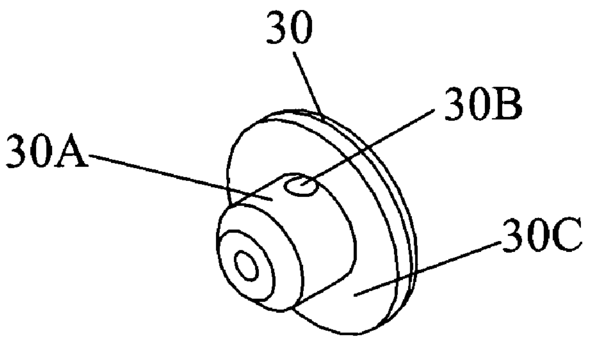
FIGS. 6A, 6B and 6C show, respectively, a perspective view, an end view and a cut-away view of the positive and negative contacts of FIG. 2.
Figure 6B:
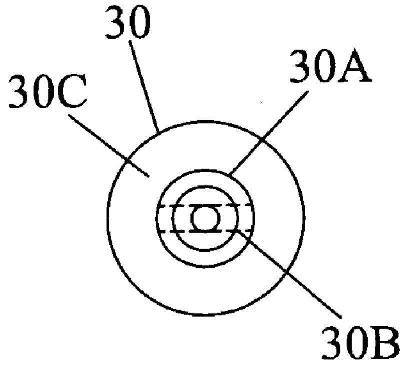
Figure 6C:
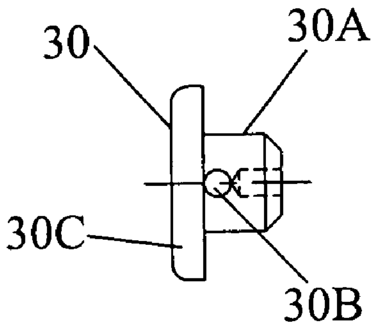

With reference now to FIGS. 6A, 6B, 6C, contact 30 (identical to contact 42) is seen to be generally cylindrical in shape, including a longitudinally extending cylindrical plug 30A and end wall 30C for engaging the corresponding motor cap, as well as a mechanical engagement apparatus such as a detent 30B for securing the contact to the cap.

It will be understood by the reader that other configurations of motor assembly 12 may be used, for example with various parts of the motor mount, end caps and/or contacts assembled as one or more integral units.

With reference now to FIGS. 7A and 7B, housing 10 is seen to be generally cylindrical in shape, formed with one domed end 10A closed and the opposing end 10B open for receiving the various above-described electro mechanical components. As described herein, the housing is generally sized to facilitate intimate contact with the human body so as to impart a massaging sensation thereto.

With reference now to FIGS. 8A, 8B, 8C and 8D, housing cap 22 is seen to be generally cylindrical in shape, including a male section 22A configured to a engage mating female section 10B of housing 10, preferably in a threaded screw engagement, optionally in a force-fit, detent-fit or other mechanical engagement. The housing cap is further seen to include knurled, knob section 22B for facilitating human operation, that is tightening and loosening the threaded connection to housing 10. An aperture 22C may optionally be included extending through knob section 22B and into the hollow cylindrical interior of the housing cap, whereby to facilitate, for example, a gas release valve. Aperture 22C also facilitates the attachment of a strap such as a wrist strap or necklace to facilitate the use of the vibrating massager.

With reference now to FIGS. 9A, 9B and 9C, offset weight 38 is seen to comprise a solid cylinder of relatively smaller diameter than that of housing 10. Weight 38 further includes a relatively smaller, cylindrical aperture 38B extending into one surface thereof and offset eccentrically from the longitudinal center thereof. As described elsewhere herein, aperture 38 is for receiving axle 34B of motor 34, whereby to rotate within housing 10 and impart a vibration to housing 10 upon the operation of the motor 34.

With respect to the illustrated embodiment of the invention, there is provided a personal vibrator that is simple in construction and operation, small, safe, waterproof, and virtually silent. In operation, the vibrator has no speed settings; it is either on or off. It is turned on by screwing in the threaded end cap 22 until the battery 14 is in contact with the spring 16 in the end cap on one side and the motor lead of motor assembly 12 on the other. The vibrator is powered by a single AA battery. In an embodiment of the invention, the vibrator housing will have a gas pressure release feature in case the battery is short circuited, for example a release valve incorporated into the threaded end cap 22. In another embodiment of the invention, a speed control, for example in the form of a multi-positionable switch or rheostat is provided whereby the speed of the vibrator can be adjusted.

The motor is constructed to be durable enough to handle the wear and tear of the off-center weight. The motor, weight and configuration of the weight on the motor are selected so that the motion that it creates will be a high amplitude but low frequency motion. The motor will thus provide a desirable throb and avoid an undesirable buzz. The motor is user replaceable without the requirement to use any tools. While the vibrating motor has been described herein as using a rotating eccentric weight to generate the vibrations, it will be understood by the reader that the invention is not thus limited. Suitable vibrating motion may be produced by other types of small, replaceable, battery-operated motors, for example using a solenoid actuator, a piezoelectric actuator, or one of many other types of mechanisms now readily apparent to the reader.

The personal vibrator as illustrated may be constructed from a bio-compatible, esthetically pleasing material, for example satin or polished finish stainless steel, plated gold, and/or plated platinum. A tip-to-tube welded assembly is optional. The personal vibrator as illustrated is seen to be generally in the shape of a human phallus and thus particularly suited for erotic or sexual stimulation.

In the illustrated embodiment, the o-ring 18 is rolled into a groove on the cap 22. The check valve 20 is pressed into the cap. The battery contact spring 16 is inserted into the cap. The motor 34 may optionally be glued or otherwise fixed or potted into place in the motor assembly 12, to minimize rattling and/or vibration. In the illustrated embodiment, the positive lead of the motor 34 is soldered and threaded through the center hole of the positive cap 40. The motor mount center 36 may be bonded to the positive cap, and the vibrating weight 38 is mounted to the motor by swaging or staking onto the axle of the motor. The motor mount 36 is bonded to the negative cap 30 and the positive motor lead is soldered to the positive contact 42.

In the described embodiment, the negative contact 30 is inserted into the motor mount negative cap 32. The positive lead is soldered to the motor and to the positive contact. The positive lead is inserted into the channel 36E leading to the motor mount positive cap where the positive contact is pressed into place. Motor contacts may be tested by applying a 1.5V voltage across the positive and negative contacts.

In the process of assembling the illustrated embodiment of the personal vibrator, the motor subassembly 12 is inserted into the housing 10. The battery 14 is inserted into the housing, and the threaded cap 22 is screwed onto the housing and tightened until it stops. The personal vibrator should now be operating, and can be tested to confirm performance to specifications. The battery may be removed, the cap loosened, or the circuit otherwise disconnected, before packaging and shipping for sale to a customer.

While a vibrating massager in accordance with the present invention has been shown and described with respect to a particular embodiment, numerous other configurations and embodiments will be apparent to the reader.

Since a vibrating massager employing the inventive motor system can continue to operate for many years, simply by replacing the motor each time it fails or degrades, the vibrating massager can have a much longer lifespan than is typical in the industry. Knowing that a product can be repaired and used for a long period of time significantly increases the willingness of consumers to invest in a higher priced product. As it no longer needs to be a disposable product, a vibrating massager employing the modular motor design of the present invention can be made of much higher quality materials and construction, the cost of those materials and construction justified by the lifespan of the vibrator.

Hygiene is an important concern with vibrating massagers which may come in intimate contact with the body. Many vibrating massagers currently available are difficult to clean thoroughly because the internal components must be protected from moisture. The modular motor design of the present invention permits the easy removal of all moisture-sensitive components from within the vibrating massager so that it can be thoroughly cleaned, or even sterilized with heat and/or chemical treatments.

In addition, in the illustrated embodiment, the housing unit of the massager is constructed of stainless steel. The stainless steel and other finishes or plating materials are desirably selected to be sterile and safe for intimate contact with the human body. Currently there are no regulations on what materials can be used in the construction of vibrating massagers. With respect to prior art devices, many of the materials or the methods by which the prior art products are produced can be irritating or even toxic to the human body. Numerous other construction materials will now be apparent to the reader.

Different users of vibrating massagers often prefer different types of sensations. The modular motor system of the present invention, incorporating replaceable motors, enables a single vibrator to offer many different sensations by interchanging a variety of motors with different vibration characteristics.

By simply extending the size of the housing or shrinking the size of the vibrator motor, the vibrating massager of the present invention supports the use of multiple motor modules, thereby enabling a user to increase the intensity of the sensation. Additionally, when multiple motor modules are employed, each module could offer a different frequency or intensity of vibration, providing different sensations in different areas of the product. When two motors are close in frequency to one another, the vibrations may interfere with one another causing "beats"—periodic shifts in intensity over time—similar to the effect that musicians use to tune instruments. For some users, this may be a desirable sensation for the vibrating massager to generate.

In an alternate embodiment of the invention, an electrical, electro-mechanical or mechanical controller is incorporated into the motor housing, and can be used to adjust the vibratory characteristics of the motor, whereby the characteristics of the vibrator can be adjusted to provide the sensations desired by the user. In this alternate embodiment of the invention, the motor may be removed from the vibrator, adjusted to provide the desired vibratory characteristics, and reinserted into the vibrator. The controller may comprise, for example, a microprocessor and/or an adjustable mechanical mechanism.

One typical undesirable characteristic of many personal vibrators is a loud rattling noise, often found as a result of wear due to use. The present invention eliminates this problem by creating a removable vibrating motor module that can be easily replaced. The motor module of the present invention is constructed so that no tools are needed to remove an expired unit and to insert a new motor into the housing unit of the massager. As described above, in alternate embodiments of the invention, the vibrator may be constructed such that conventional, readily available tools, such as a screwdriver and/or pliers, are used to disassemble the housing and replace the motor.

While the vibrating motor of the present invention is shown and described as used in a personal vibrator, the reader will appreciate that the motor module is a flexible design that can be employed in many different devices and has many different uses. As described in the present invention, the motor module is made to the same dimensions of and with the same electrical connections as a AA battery. The reader will understand that the vibrating motor may be made to simulate, that is made to the same overall dimensions as, any other battery. A motor thus configured can be inserted into any product accommodating the simulated battery. The vibrating motor of the present invention can thus be used to make any product that utilizes multiple batteries vibrate. If, for instance, a motor module were made to the same dimensions of a AAA battery, this motor module could be inserted, accompanied by one AAA battery, into a flashlight that runs on two AAA batteries. The flashlight would then operate as a vibrating massager, as well as a light source, when it was turned on. This idea is extensible to many other products including many other shapes and sizes of batteries.

The motor is battery run and, in the present invention, is illustrated as being powered by a single AA battery. The illustrated massager thus uses one AA battery. When the motor and/or the battery need to be replaced they can slide out of the metal housing once the cap 22 (top) is taken off. As noted above, the motor of the present invention can be sized, both mechanically and electronically, to operate with batteries of different sizes and voltages.

If the motor is inserted into the housing backwards and the battery is placed on top, the motor will not operate and hence the massager can not be turned on even if the cap is screwed on completely. This allows consumers to store the massager or to travel with the massager without accidentally turning it on. Alternatively, when traveling or storing the battery (i.e. desiring discretion as to the purpose of the device) users can remove the battery and motor and store them separately. The device then becomes an innocuous housing without obvious (or embarrassing) purpose.

There has thus been provided a new and improved vibrating massager including a motor that is readily replaceable by a human user. There has further been provided a new and improved motor assembly and personal vibrator incorporating the motor assembly. The motor assembly is sized and configured to substitute for a battery in a multi-battery device. When positioned in place of a battery, the motor assembly operates to impart a vibrating motion to the device. When incorporated in a personal vibrator, the motor may be easily changed, thus enabling not only simple replacement of a worn or inoperative motor, but also enabling the user to easily interchange motors having different operating characteristics. Multiple motors may be incorporated into a single vibrator, and in the described personal vibrator all sensitive components including motors and batteries may be easily removed to enable cleaning and sterilization of the device. The invention has application in the field of vibrating devices, including but not limited to personal vibrators.

While the invention has been shown and described with respect to particular embodiments, it is not thus limited. Numerous modifications, changes and improvements, within the scope of the invention, will now be apparent to the reader.

What is claimed is:

1. A vibrating device, comprising:

an outer housing configured to be cylindrical in shape and to approximate the size and shape of a selected battery, the housing having a cylindrical shape and extending between a first end and a second end;

a vibrating motor assembly including a motor positioned in a motor housing, an output shaft connected to the motor and extending out of the motor housing, and an eccentrically positioned offset weight affixed to the output shaft, the vibrating motor assembly being fully contained within the outer housing;

positive and negative electrical contacts positioned respectively on the first and second ends of the outer housing in approximation of the size and position of the positive and negative electrical contacts on the selected battery; and the positive and negative electrical contacts connected to the motor so as to provide power to the motor;

whereby when the vibrating motor device is positioned in a battery-operated device an electrical contact of the motor housing receives power from the selected battery to impart a vibratory motion to the battery-operated device.

2. The assembly of claim 1 wherein the rotating motor is positioned to rotate the offset weight about a longitudinal axis of the motor housing.

3. The device of claim 1, wherein the outer housing includes a sleeve forming the second end of the outside housing and having a first opening opposite the second end of the outside housing, the first opening having a diameter that is smaller than an interior diameter of the sleeve to form a flange, and wherein the motor housing is contained within the sleeve such that the output shaft extends through the fist open end such that the offset weight is outside the sleeve.

4. The device of claim 3, wherein the outer housing further includes a cap including a cavity therein and fitting over the offset weight, the cap forming a mating section with the sleeve to enclose the vibrating motor assembly, and wherein the cap includes the first end of the housing.

5. The device of claim 3, wherein a portion of the sleeve including the second end of the outside housing is formed separately from the remaining portion of the sleeve and is configured to be assembled thereto after assembly of the motor into the remaining portion of the sleeve.

6. The personal vibrator of claim 1, wherein the selected battery configuration is from the group comprising AAA, AA, C and D battery configurations.

7. A vibrating device, comprising:

a seamless cylindrical housing having a cylindrical interior accessible through an end cap, the interior sized to support at least two cylindrical batteries of a selected configuration;

a battery of the selected configuration positioned in the housing;

a removable vibrating motor assembly configured in the general size and shape of the selected battery configuration positioned in the housing abutting the battery, the vibrating motor assembly including a vibrating motor and a pair of electrical contacts, each of the electrical contacts positioned on a corresponding one of the outer ends of the vibrating motor assembly; and an electrical contact on the removable vibrating motor assembly operable to engage a contact on the battery to supply power from the battery to the vibrating motor and impart a vibrating motion to the vibrating device.

8. The device of claim 7 wherein the vibrating motor includes a rotating motor connected to drive an eccentrically positioned offset weight, the rotating motor and the offset weight fully contained within the motor housing.

9. The device of claim 8 wherein the rotating motor is positioned to rotate the offset weight about a longitudinal axis of the motor housing.

10. The device of claim 8 wherein the motor housing includes longitudinally extending grooves in an outer surface.

11. The device of claim 7 wherein the housing is of a bio-compatible material.

12. The device of claim 7 wherein the end cap is connected to the housing with a water-resistant seal.

13. The device of claim 7, wherein the removable vibrating motor is configured to be self-aligning within the cylindrical interior such that a longitudinal axis of the motor substantially aligns with a longitudinal axis of the cylindrical interior.

14. A personal vibrator, comprising:

a cylindrical housing of a bio-compatible material including an electrically conductive cylindrical interior accessible through an end cap of the housing, the interior sized to support at least two batteries each of a selected configuration;

a battery of the selected configuration positioned in the housing;

a removable vibrating motor assembly configured in the general size and shape of the selected battery configuration positioned in the housing adjoining the battery, the vibrating motor assembly including a vibrating motor and a pair of electrical contacts, the electrical contacts positioned on a corresponding one of the ends of the vibrating motor assembly in the selected battery configuration for supplying power from the battery to the vibrating motor;

the removable vibrating motor assembly positioned in the interior of the housing in the position of a second battery with a first of the pair of electrical contacts abutting the battery and a second of the pair of electrical contacts abutting the housing whereby to provide power to the vibrating motor;

the removable vibrating motor assembly operable to impart a vibrating motion to the personal vibrator when power from the battery is applied to be vibrating motor through the electrical contacts; and the housing including at least one water-resistant seal operative to secure both the battery and the removable vibrating motor assembly within the housing whereby the personal vibrator is water-resistant.

15. The personal vibrator of claim 14, wherein the selected battery configuration is from the group comprising AAA, AA, C and D battery configurations.

16. The personal vibrator of claim 14, wherein the removable vibrating motor assembly is configured to impart to a vibratory motion of a selected frequency and magnitude to the housing.

17. The personal vibrator of claim 14, comprising a plurality of the removable vibrating motor assemblies contained within the housing, each of the vibrating motor assemblies simultaneously operable by the battery.

18. The personal vibrator of claim 17, wherein each of the plurality of vibrating motor assemblies is selected to vibrate at a specific frequency and magnitude.

19. The assembly of claim 14 wherein the motor housing includes longitudinally extending grooves in an outer surface.

20. The vibrator of claim 14 wherein the vibrating motor includes a rotating motor connected to drive an eccentrically positioned offset weight, the rotating motor and the offset weight fully contained within the motor housing.

21. The assembly of claim 20 wherein the rotating motor is positioned to rotate the offset weight about a longitudinal axis of the motor housing.

22. The assembly of claim 20 wherein the motor housing includes longitudinally extending grooves in an outer surface.

23. The assembly of claim 14, wherein the abutment of the first of the pair of contacts with the battery and the abutment of the second of the pair of contacts with the housing substantially secure the removable vibrating motor in its position within the housing.

* * * * *